United States Patent
Jung et al.

(10) Patent No.: US 12,293,178 B2
(45) Date of Patent: May 6, 2025

(54) VEHICULAR SOFTWARE UPDATE SYSTEM AND METHOD THEREFOR

(71) Applicants: Hyundai Motor Company, Seoul (KR); Kia Corporation, Seoul (KR)

(72) Inventors: Yoon Sik Jung, Seoul (KR); Myeong Gyu Jeong, Seoul (KR); Jin Ah Kim, Gyeonggi-Do (KR); Hak Jun Kim, Goyang-Si (KR); Min Gi Kim, Wonju-Si (KR); Hyeok Sang Jeong, Hwaseong-Si (KR); Young Jee Yang, Seongnam-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 154 days.

(21) Appl. No.: 18/179,774

(22) Filed: Mar. 7, 2023

(65) Prior Publication Data
US 2024/0069888 A1 Feb. 29, 2024

(30) Foreign Application Priority Data
Aug. 25, 2022 (KR) .......... 10-2022-0106968

(51) Int. Cl.
*H04W 72/04* (2023.01)
*B60W 50/06* (2006.01)
(Continued)

(52) U.S. Cl.
CPC ............... *G06F 8/65* (2013.01); *B60W 50/06* (2013.01); *B60W 2556/45* (2020.02)

(58) Field of Classification Search
CPC ........ G06F 8/65; G06F 9/4881; G06F 9/5027; G06F 9/4484; G06F 9/505; G06F 9/5077;
(Continued)

(56) References Cited

U.S. PATENT DOCUMENTS 8,706,798 B1 * 4/2014 Suchter .................. H04L 47/83
709/224
10,154,501 B2 12/2018 Meredith et al.
(Continued)

FOREIGN PATENT DOCUMENTS

| CN | 103403707 A | * 11/2013 | ........... C12N 5/0693 |
| CN | 111630936 A | * 9/2020 | ........... H04B 17/318 |

(Continued)

OTHER PUBLICATIONS

Engilish PDF version of Badic et al. CN 111630936 A, published date Sep. 4, 2020.*

(Continued)

*Primary Examiner* — S. Sough
*Assistant Examiner* — Mohammad H Kabir
(74) *Attorney, Agent, or Firm* — Banner & Witcoff, Ltd.

(57) ABSTRACT

A vehicular software update system includes a management controller coupled to a vehicle and at least one performance controller that receives software for over-the-air (OTA) update in the background from the management controller. The management controller determines a network load of the vehicle and adjusts a transmission speed of the software for OTA update, the software being transmitted to the at least one performance controller, based on a driving state of the vehicle and the network load of the vehicle.

20 Claims, 6 Drawing Sheets

(51) Int. Cl.
  *G06F 8/65* (2018.01)
  *H04W 4/02* (2018.01)
  *H04W 4/029* (2018.01)
  *H04W 4/42* (2018.01)

(58) Field of Classification Search
  CPC .......... G06F 9/542; G06F 9/546; G06F 21/55; B60W 50/06; B60W 2556/45; H04L 12/40; H04L 2012/40273
  See application file for complete search history.

(56) References Cited

U.S. PATENT DOCUMENTS

| | | | |
|---|---|---|---|
| 11,580,593 B2 * | 2/2023 | Onodera | G06Q 30/0284 |
| 2018/0317067 A1 * | 11/2018 | Ameixieira | H04W 4/50 |
| 2021/0081192 A1 * | 3/2021 | Jeong | G06F 8/65 |
| 2022/0104285 A1 * | 3/2022 | Hirashima | H04L 67/12 |

FOREIGN PATENT DOCUMENTS

| | | | | |
|---|---|---|---|---|
| CN | 112052017 A | | 12/2020 | |
| JP | 2020-188407 A | | 11/2020 | |
| JP | 2021-105922 A | | 7/2021 | |
| JP | 2022-023690 A | | 2/2022 | |
| KR | 102231503 B1 | | 3/2021 | |
| KR | 10-2021-0038851 A | | 4/2021 | |
| KR | 10-2021-0145400 A | | 12/2021 | |
| WO | WO-2020023325 A1 * | 1/2020 | ......... | H04L 12/4625 |

OTHER PUBLICATIONS

Engilish PDF version of CAi et al. et al. CN 112052017 A, published date Jun. 28, 2018.*
English PDF version of Choudhry et al. CN 112052017 A1 pubished date Nov. 20, 2013.*

* cited by examiner

| THE NUMBER OF MESSAGES PER SECOND | MESSAGE INTERVAL OF CHANNEL A | MESSAGE INTERVAL OF CHANNEL B | MESSAGE INTERVAL OF CHANNEL C |
|---|---|---|---|
| 0~100 | 1ms | 2ms | 0ms |
| 101~200 | 2ms | 4ms | 1ms |
| 201~ | 4ms | 8ms | 2ms |

FIG.3

| TOTAL CPU LOAD | RESOURCE ALLOCATION TO GROUP A | RESOURCE ALLOCATION TO GROUP B | RESOURCE ALLOCATION TO GROUP C |
|---|---|---|---|
| ~50% | 40% | 40% | 20% |
| ~70% | 60% | 30% | 10% |
| 70%~ | 80% | 10% | 10% |

FIG.4

VEHICULAR SOFTWARE UPDATE SYSTEM AND METHOD THEREFOR

CROSS-REFERENCE TO RELATED APPLICATION

This application claims the benefit of priority to Korean Patent Application No. 10-2022-0106968, filed in the Korean Intellectual Property Office on Aug. 25, 2022, the entire contents of which are incorporated herein by reference.

TECHNICAL FIELD

The present disclosure relates to a vehicular software update system and a method therefor, and more particularly, relates to technologies of controlling a communication load in a vehicle to speed up a vehicular software update.

BACKGROUND

As a controller area network (CAN) or a controller area network with flexible data (CANFD) which may be used for in-vehicle networks is configured with a bus topology, a reprogramming (diagnosis) message with a low priority is likely to be missed when the network load is high. There should be no missing message for stable reprogramming. Furthermore, when there are many Rx messages even inside the management controller, because the CPU load tends to increase, there is a need to suitably adjust loads.

Because the CAN or the CANFD has many periodic messages, a bus load may be high enough to reach a management reference value. Due to characteristics of a CAN protocol in which a message is automatically discarded when the message has a low priority when the bus load is high, a reprogramming diagnostic message may be discarded because of having a low priority. Furthermore, when the bus load is high, because there are many interruptions due to characteristics of a gateway management controller which receives all messages, a CPU load may increase. When the CPU load increases, because a transmission speed deteriorates and a delay in a diagnostic message processing time may occur as it is difficult to allocate many CPU resources to an over-the-air (OTA) operation, stability may decrease due to the occurrence of time-out or the like.

Descriptions in this background section are provided to enhance understanding of the background of the disclosure, and may include descriptions other than those of the prior art already known to those of ordinary skill in the art to which this technology belongs.

SUMMARY

The following summary presents a simplified summary of certain features. The summary is not an extensive overview and is not intended to identify key or critical elements.

An aspect of the present disclosure provides a vehicular software update system for reducing a network load stage by stage inside and outside a management controller for stable high-speed OTA reprogramming and a method therefor.

Another aspect of the present disclosure provides a vehicular software update system for reducing the number of messages outside a management controller in an OTA occurrence scenario and allocating maximum many CPU resources to an OTA operation inside the management controller and a method therefor.

The technical problems to be solved by the present disclosure are not limited to the aforementioned problems, and any other technical problems not mentioned herein will be clearly understood from the following description by those skilled in the art to which the present disclosure pertains.

A vehicular software update system may comprise: a management controller coupled to a vehicle; and at least one processor configured to receive, from the management controller, software for over-the-air (OTA) update, wherein the management controller is configured to: determine a network load of the vehicle; adjust, based on a driving state of the vehicle and the network load of the vehicle, a transmission speed of the software for OTA update; and transmit, to the at least one processor and based on the adjusted transmission speed, the software for OTA update.

The management controller may be configured to determine, based on a detection of a controller area network (CAN) message, the network load of the vehicle.

The management controller may be configured to adjust the transmission speed by decreasing, based on a determination that the driving state of the vehicle corresponds to a traveling state, the transmission speed in response to a determination that the network load of the vehicle is greater than or equal to a reference value. The at least one processor may be configured to execute a foreground process while receiving the software for OTA update in a background process.

The management controller may be configured to adjust the transmission speed by determining, based on a software package and based on event properties, a background transmission interval to correspond to a message interval, wherein the message interval corresponds to a larger value between a minimum message interval associated with reprogramming in the at least one processor and a minimum message interval for each channel. The software package may comprise the minimum message interval associated with reprogramming in the at least one processor. The event properties may comprise at least one of the minimum message interval for each channel, or information of a processor associated with OTA update among the at least one processor.

The management controller may be further configured to: determine, based on event properties, a processor associated with OTA update among the at least one processor; allow, based on a determination that the driving state of the vehicle corresponds to an end of traveling, communication with the processor associated with OTA update among the at least one processor, in response to a determination that the network load of the vehicle is greater than or equal to a reference value; and adjust the transmission speed by prohibiting communication with a processor not associated with OTA update among the at least one processor. The event properties may comprise at least one of: a minimum message interval for each channel, or information of the processor associated with OTA update.

The management controller may be configured to, after an OTA update is completed, allow communication with the processor not associated with OTA update.

The management controller may be configured to reallocate, based on a determination that the driving state of the vehicle corresponds to an end of traveling, a central processing unit (CPU) resource to at least one module in the management controller, in response to a determination that a CPU load is greater than or equal to a reference value.

The management controller may be further configured to: group, based on a degree associated with OTA update, the at least one module; assign, based on the degree associated with OTA update, a priority to at least one group comprising the at least one module; and allocate, based on the priority and the CPU load, the CPU resource to the at least one module.

The management controller may be further configured to set a priority of a group with a high degree associated with OTA update among a plurality of groups to be higher than a priority of a group with a low degree associated with OTA update among the plurality of groups. The management controller may be configured to allocate more CPU resources to a group with a high priority than a group with a low priority.

The management controller may be configured to, after an OTA update is completed, reallocate the CPU resource to the at least one module using a predetermined default value.

A vehicular software update method may comprise: determining, by a management controller, a network load of a vehicle; adjusting, by the management controller and based on a driving state of the vehicle and the network load of the vehicle, a transmission speed of software for over-the-air (OTA) update; and transmitting, by the management controller and based on the adjusted transmission speed, the software for OTA update to at least one processor that receives the software for OTA update in a background process.

The vehicular software update method may further comprise determining, by the management controller and based on a detection of a controller area network (CAN) message, the network load of the vehicle.

The vehicular software update method may further comprise executing, by the at least one processor, a foreground process while the at least one processor receives the software for OTA update in the background process. The adjusting of the transmission speed may comprise decreasing, by the management controller and based on a determination that the driving state of the vehicle corresponds to a traveling state, the transmission speed in response to a determination that the network load of the vehicle is greater than or equal to a reference value.

The adjusting of the transmission speed may comprise determining, by the management controller and based on a software package and based on event properties, a transmission interval to correspond to a message interval, wherein the message interval corresponds to a larger value between a minimum message interval associated with reprogramming in the at least one processor and a minimum message interval for each channel. The software package may comprise the minimum message interval associated with the reprogramming in the at least one processor. The event properties may comprise at least one of: the minimum message interval for each channel, or information of a processor associated with OTA update among the at least one processor.

The adjusting of the transmission speed may comprise: determining, by the management controller and based on event properties, a processor associated with OTA update among the at least one processor; allowing, by the management controller and based on a determination that the driving state of the vehicle corresponds to an end of traveling, communication with the processor associated with OTA update among the at least one processor, in response to a determination that the network load of the vehicle is greater than or equal to a reference value; and adjusting, by the management controller, the transmission speed by prohibiting communication with a processor not associated with OTA update among the at least one processor. The event properties may comprise at least one of: a minimum message interval for each channel, or information of the processor associated with OTA update.

The vehicular software update method may further comprise after an OTA update is completed, allowing, by the management controller, communication with the processor not associated with OTA update.

The vehicular software update method may further comprise reallocating, by the management controller and based on a determination that the driving state of the vehicle corresponds to an end of traveling, a central processing unit (CPU) resource to at least one module in the management controller, in response to a determination that a CPU load is greater than or equal to a reference value.

The reallocating of the CPU resource to the at least one module may comprise: grouping, by the management controller and based on a degree associated with OTA update, the at least one module; assigning, by the management controller and based on the degree associated with OTA update, a priority to at least one group comprising the at least one module; and allocating, by the management controller and based on the priority and the CPU load, the CPU resource to the at least one module.

A priority of a group with a high degree associated with the OTA update among a plurality of groups may be set to be higher than a priority of a group with a low degree associated with OTA update among the plurality of groups. The vehicular software update method may further comprise allocating, by the management controller, more CPU resources to a group with a high priority than a group with a low priority.

The vehicular software update method may further comprise after an OTA update is completed, reallocating, by the management controller, the CPU resource to the at least one module using a predetermined default value.

These and other features and advantages are described in greater detail below.

BRIEF DESCRIPTION OF THE DRAWINGS

The above and other objects, features and advantages of the present disclosure will be more apparent from the following detailed description taken in conjunction with the accompanying drawings:

FIG. 3 illustrates an example of a minimum message interval for each channel, which is used to adjust a background transmission speed while driving, in a vehicular software update system and a method therefor;

FIG. 4 illustrates an example of allocating a CPU resource after driving is ended in a vehicular software update system and a method therefor;

DETAILED DESCRIPTION

Figure 1:
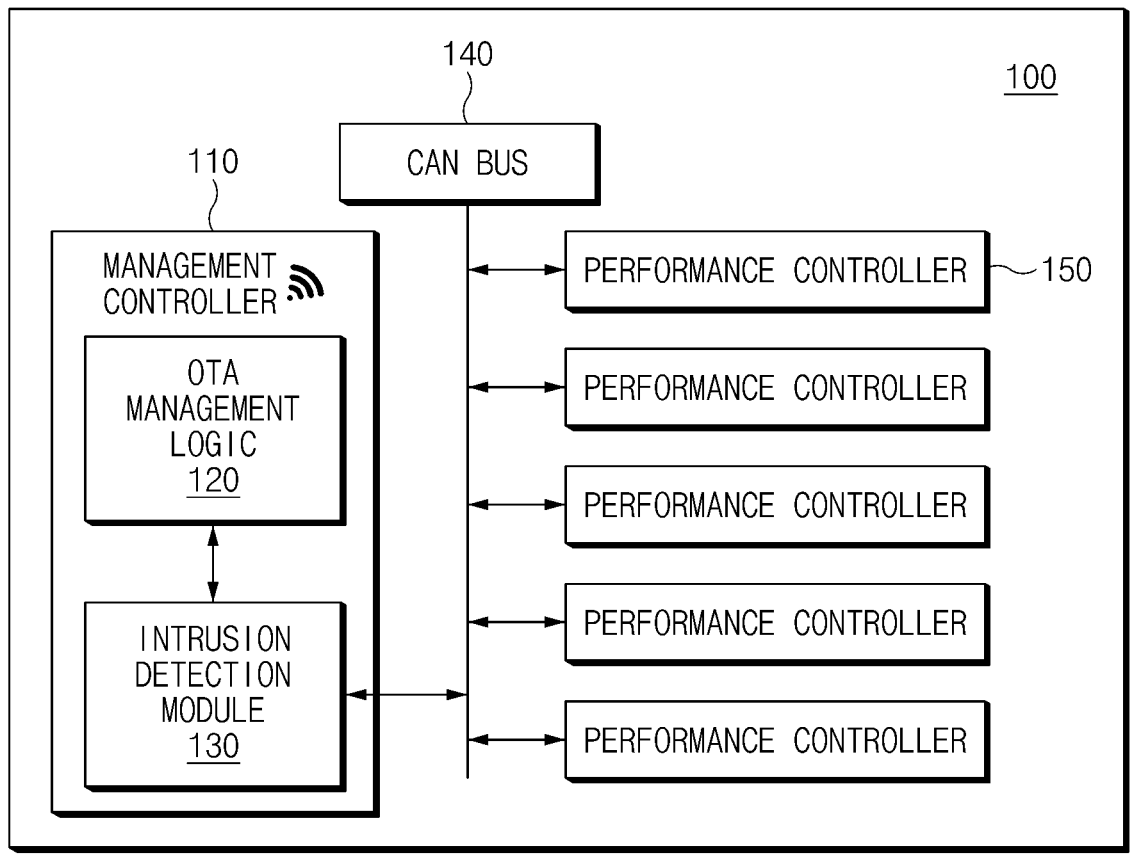
FIG. 1 is a block diagram of an example vehicular software update system.

Hereinafter, various examples of the present disclosure will be described in detail with reference to the exemplary drawings. In the drawings, the same reference numerals will be used throughout to designate the same or equivalent elements. In addition, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are only used to distinguish one element from another element, but do not limit the corresponding elements irrespective of the order or priority of the corresponding elements. Furthermore, unless otherwise defined, all terms including technical and scientific terms used herein are to be interpreted as is customary in the art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, various examples of the present disclosure will be described in detail with reference to FIGS. 1 to 6.

FIG. 1 is a block diagram of an example vehicular software update system.

Referring to FIG. 1, a vehicular software update system 100 may include a management controller 110, a controller area network (CAN) bus 140, and at least one performance controller 150. The respective components may be combined into one component and some components may be omitted, depending on a manner where the vehicular software update system 100 operates. In the present disclosure, the performance controller 150 may refer to at least one performance controller.

The management controller 110 may include over-the-air (OTA) management logic 120 and an intrusion detection module 130. The management controller 110 may include an additional component other than the components shown in FIG. 1, or may omit at least one of the components shown in FIG. 1.

The OTA management logic 120 may manage software version information for each performance controller 150 and may be in charge of an OTA update if a software update is available and/or required.

The management controller 110 may download a software package for updating at least one target software from a server (not shown).

For example, the software package may include software for update. For example, the software package may include a minimum message interval capable of being received upon reprogramming in the performance controller 150.

The management controller 110 may transmit software (e.g., latest version software) for update, which is included in the downloaded software package, to the performance controller 150 to perform reprogramming.

The management controller 110 may detect a network load of the CAN bus 140.

The intrusion detection module 130 may count the number of CAN messages (e.g., a quantity of received CAN messages and/or a quantity of transmitted CAN messages). Due to the network characteristic of the CAN bus 140, the number of CAN messages may be converted into a network load rate in the vehicle.

The management controller 110 may determine a load rate for each channel based on the number of the counted CAN messages (e.g., by using the intrusion detection module 130).

The management controller 110 may dynamically adjust the number of OTA messages based on the load rate for each channel (e.g., by using the OTA management logic 120). The performance controller 150 may be a software update target, which may be an electronic control unit (ECU) which is loaded into the vehicle to perform a predetermined function (e.g., a driver assistance function, an obstacle detection function, and/or the like). Although not illustrated in the drawing, the performance controller 150 may include a processor, a memory, a communication circuit, and the like.

The performance controller 150 may receive and store software for update, which is transmitted from the management controller 110.

The performance controller 150 may perform reprogramming using the software for update to update software (e.g., previously stored control logic) installed in the performance controller 150.

Figure 2:
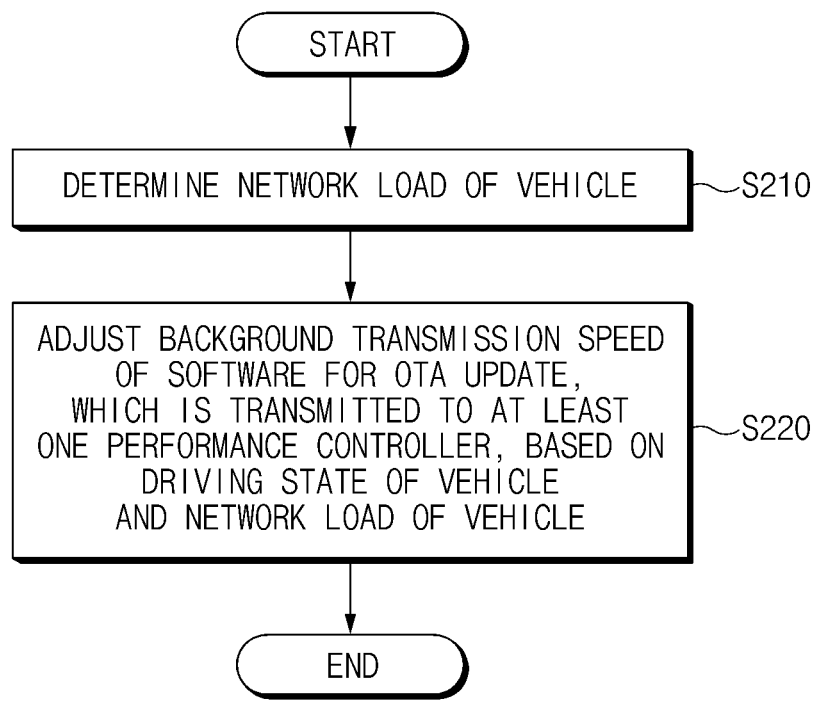
FIG. 2 is a flowchart illustrating an example vehicular software update method.

FIG. 2 is a flowchart illustrating an example vehicular software update method.

Operations in S210 and S220 may be sequentially performed, but are not necessarily sequentially performed. For example, an order of the respective operations may be changed, and at least two operations may be performed in parallel.

In the vehicular software update system and the method therefor, a management controller may determine a network load of a vehicle (e.g., in S210).

The management controller may determine the network load of the vehicle based on detecting a CAN message (e.g., by using an intrusion detection module).

The management controller may count the number of CAN messages per unit time.

For example, the management controller may count the number of CAN messages per minute (e.g., by using the intrusion detection module).

If software for OTA update is transmitted in the background while the vehicle is traveling, the management controller may count the number of CAN messages.

The management controller may convert the number of CAN messages into a network load rate in the vehicle.

The management controller may determine a load rate for each channel based on the number of the counted CAN messages.

In the vehicular software update system and the method therefor, the management controller may adjust a background transmission speed of software for OTA update, which is transmitted to at least one performance controller based on a driving state of the vehicle and a network load of the vehicle (e.g., in S220).

If it is determined that the communication load is excessive while the vehicle is traveling (e.g., when it is determined that the communication load is greater than or equal to a reference value), the management controller may decrease a background transmission speed of software for OTA update. If it is determined that that the communication load is not excessive while the vehicle is traveling (e.g., when it is determined that the communication load is lower than the reference value), the management controller may maintain a background transmission speed of software for OTA update.

If the driving state of the vehicle is traveling, the management controller may decrease the background transmission speed of the software for OTA update in response to a determination that the network load of the vehicle is greater than or equal to a reference value.

If the driving state of the vehicle is traveling, the management controller may decrease the background transmission speed. The management controller may decrease the background transmission speed by determining, based on a software package and event properties, a background transmission interval to correspond to a message interval that is a larger value between a minimum message interval capable of being received upon reprogramming in the at least one performance controller and a minimum message interval for each channel.

For example, the software package may include the minimum message interval capable of being received upon the reprogramming in the at least one performance controller. In the present disclosure, the message interval may refer to a time interval between message transmissions. In the present disclosure, the minimum message interval may refer to a minimum time interval between message transmissions. This refers to the detected minimum message interval.

The event properties may include at least one of: a minimum message interval for each channel, information of a performance controller associated with OTA, or a combination thereof.

If it is determined that the communication load is excessive after the driving of the vehicle is ended (e.g., when it is determined that the communication load is greater than or equal to the reference value), the management controller may prohibit communication with an unnecessary performance controller (e.g., at least one performance controller not associated with the OTA) to increase a background transmission speed of software for OTA update.

The management controller may determine whether the at least one performance controller is associated with OTA based on the event properties.

If the driving state of the vehicle is at end of traveling, the management controller may determine whether the at least one performance controller is associated with the OTA, in response to a determination that the network load of the vehicle is greater than or equal to the reference value.

The management controller may allow communication with the performance controller associated with the OTA among the at least one performance controller and may prohibit communication with a performance controller not associated with the OTA among the at least one performance controller.

The management controller may control communication with the at least one performance controller depending on whether the at least one performance controller is associated with the OTA, thus adjusting the background transmission speed of the software for OTA update.

FIG. 3 illustrates an example of a minimum message interval for each channel, which is used to adjust a background transmission speed while driving, in a vehicular software update system and a method therefor.

Referring to FIG. 3, in the vehicular software update system and the method therefor, if it is determined that a communication load is excessive while a vehicle is traveling, (e.g., when it is determined that the communication load is greater than or equal to a reference value), a management controller may decrease a background transmission speed of software for OTA update.

If the driving state of the vehicle is traveling, the management controller may decrease the background transmission speed of the software for OTA update in response to a determination that the network load of the vehicle is greater than or equal to the reference value.

If the software for OTA update is transmitted in the background while the vehicle is traveling, the management controller may count the number of CAN messages per unit time.

The management controller may identify the number of messages per unit time in at least one channel using an intrusion detection module.

If the number of messages per unit time in each channel is greater than the number of messages predetermined in each channel, the management controller may adjust the background transmission speed of the software for OTA update.

For example, if the number of the messages per unit time in each channel is greater than the number of the messages predetermined in each channel, the management controller may adjust an interval of an OTA transmission message.

The management controller may decrease the background transmission speed by determining, based on a software package and event properties, a background transmission interval to correspond to a message interval that is a larger value between a minimum message interval capable of being received upon reprogramming in the performance controller and a minimum message interval for each channel.

The software package may include the minimum message interval capable of being received upon the reprogramming in the performance controller.

The event properties may include at least one of: the minimum message interval for each channel, information of a performance controller associated with OTA, or a combination thereof.

A message interval corresponding to a time interval when a message is transmitted may differ for each channel.

For example, if the number of detected messages per second is 0 to 100, a predetermined message interval of channel A may be 1 ms, a predetermined message interval of channel B may be 2 ms, and a predetermined message interval of channel C may be 0 ms.

For example, if the number of the detected messages per second is 101 to 200, the message interval of channel A may be 2 ms, the message interval of channel B may be 4 ms, and the message interval of channel C may be 1 ms.

For example, if the number of the detected messages per second is greater than or equal to 201, the message interval of channel A may be 4 ms, the message interval of channel B may be 8 ms, and the message interval of channel C may be 2 ms.

The management controller may adjust an OTA message interval to be transmitted at a message interval that is a larger value between a minimum message interval capable of being received upon reprogramming in the performance controller, which is included in the software package, and a minimum message interval for each channel.

If the network load in the vehicle is excessive while the vehicle is traveling, a vehicular software update system may decrease an OTA transmission speed such that it does not interfere with the driving of the vehicle.

FIG. 4 illustrates an example of allocating a CPU resource after driving is ended in a vehicular software update system and a method therefor.

Referring to FIG. 4, in the vehicular software update system and the method therefor, a management controller may maintain a start state based on a vehicle start duration and an update progress state, which are included in a control command transmitted from a server.

If the transmission of the latest version software in the background is completed within the vehicle start duration or when the vehicle start duration expires and the transmission of the latest version software in the background is completed, the management controller may receive a signal indicating that the vehicle is turned off.

If the transmission of the latest version software in the background is completed and if OTA is in an active state (or a waiting state), the management controller may determine that the vehicle is turned off.

If the vehicle is turned off, the management controller may perform an OTA update (e.g., based on approval of a user).

When performing an OTA software update by means of approval of the user, the management controller may prohibit communication with a performance controller not associated with OTA among at least one performance controller, in response to a determination that a network load of the vehicle is greater than or equal to a reference value.

Herein, the management controller may determine the performance controller not associated with the OTA among the at least one performance controller, based on event properties including information of a performance controller associated with the OTA, and may prohibit communication with the performance controller not associated with the OTA.

If the driving state of the vehicle is at an end of traveling, the management controller may reallocate a central processing unit (CPU) resource to at least one module in the management controller, in response to a determination that a CPU load is greater than or equal to a reference value.

The management controller may group the at least one module based on a degree associated with the OTA.

The management controller may assign a priority to each of groups included in at least one module based on the degree associated with the OTA.

The management controller may variably allocate a CPU resource to at least one module included in the groups depending on the priority and the CPU load.

A priority of a group with a high degree associated with the OTA among the groups may be set to be higher than a priority of a group with a low degree associated with the OTA.

The management controller may allocate more CPU resources to a group with a high priority than a group with a low priority.

For example, if the total CPU load rate is less than 50%, the management controller may allocate the CPU resource to group A by 40%, may allocate the CPU resource to group B by 40%, and may allocate the CPU resource to group C by 20%.

For example, if the total CPU load rate is greater than or equal to 50% and is less than 70%, the management controller may allocate the CPU resource to group A by 60%, may allocate the CPU resource to group B by 30%, and may allocate the CPU resource to group C by 10%.

For example, if the total CPU load rate is greater than or equal to 70%, the management controller may allocate the CPU resource to group A by 80%, may allocate the CPU resource to group B by 10%, and may allocate the CPU resource to group C by 10%. However, aspects of the present disclosure are not limited to the above examples.

According to various embodiments, the management controller may variably allocate a CPU resource to at least one module included in the groups depending on the priority of the group and the CPU load.

After the OTA update is completed, the management controller may reallocate the CPU resource to the at least one module using a predetermined default value.

After the OTA update is completed, the management controller may adjust the state of the prohibited communication with the performance controller not associated with the OTA to an allowable state.

Figure 5:
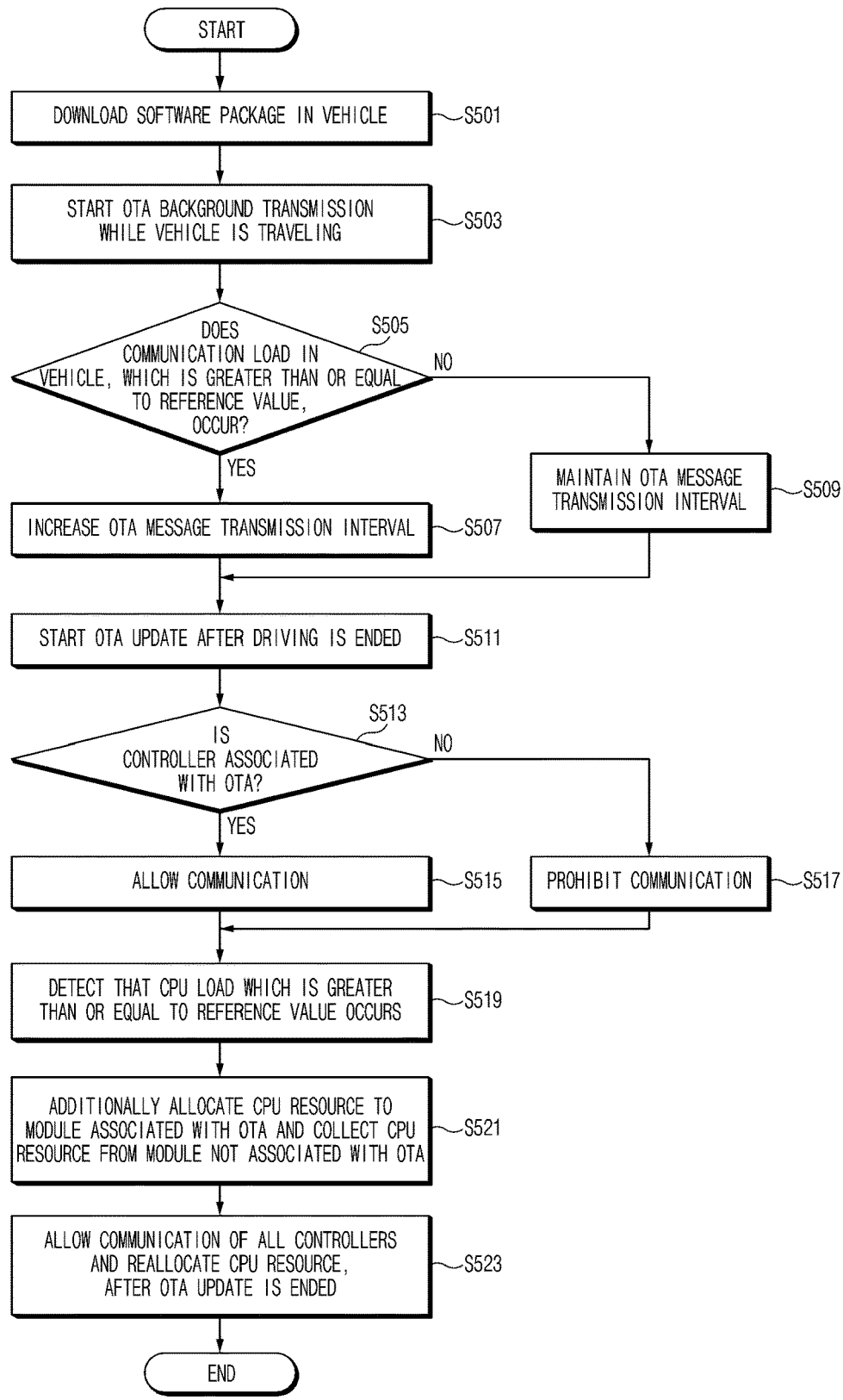
FIG. 5 is a flowchart illustrating adjusting a background transmission speed based on a driving state of a vehicle and a network load of the vehicle in a vehicular software update system and a method therefor.

FIG. 5 is a flowchart illustrating adjusting a background transmission speed based on a driving state of a vehicle and a network load of the vehicle in a vehicular software update system and a method therefor.

Operations S501 to S523 may be sequentially performed, but are not necessarily sequentially performed. For example, an order of the respective operations may be changed, and at least two operations may be performed in parallel. One or more of the operations may be omitted and/or one or more additional operations may be added.

In the vehicular software update system and the method therefor, in S501, a management controller may download a software package.

The software package may include software (e.g., latest version software) for update.

The software package may include a minimum message interval capable of being received upon reprogramming in a performance controller.

In S503, the management controller may start OTA background transmission while a vehicle is traveling.

The management controller may start background transmission of software for OTA update to the performance controller, based on the software package, while the vehicle is traveling.

In S505, the management controller may determine whether a communication load in the vehicle, which is greater than or equal to a reference value, occurs.

The management controller may count the number of CAN messages.

The management controller may an amount of communication load (or a load rate) in the vehicle based on the number of the counted CAN messages.

The management controller may determine whether the communication load in the vehicle is greater than or equal to the reference value.

If it is determined that the communication load in the vehicle is greater than or equal to the reference value (Yes of S505), in S507, the management controller may increase an OTA message transmission interval.

If it is determined that the communication load in the vehicle is greater than or equal to the reference value, the management controller may increase an OTA message transmission interval, thus reducing a background transmission speed.

The management controller may determine, based on the software package and event properties, the OTA message transmission interval as a message interval that is a larger value between a minimum message interval capable of being received upon reprogramming in the performance controller and a minimum message interval for each channel. Herein, the management controller may use the minimum message interval capable of being received upon the reprogramming in the performance controller, which may be included in the software package, and the minimum message interval for each channel, which may be included in the event properties.

If it is determined that the communication load in the vehicle is less than the reference value (No of S505), in S509, the management controller may maintain the OTA message transmission interval.

If it is determined that the communication load in the vehicle is less than the reference value, the management controller may maintain the OTA message transmission interval, thus maintaining the background transmission speed.

After the driving of the vehicle is ended, in S511, the management controller may start an OTA update.

If the vehicle is turned off, the management controller may perform an OTA update (e.g., based on approval of a user).

In S513, the management controller may determine whether each of the performance controllers is associated with OTA.

The management controller may determine, based on the event properties, whether any of the performance controllers is associated with the OTA. Herein, the management controller may use information of a performance controller associated with the OTA, which may be included in the event properties.

If it is determined that the performance controller is associated with the OTA (Yes of S513), in S515, the management controller may allow communication with the performance controller.

The management controller may allow, based on the event properties, communication with the performance controllers associated with the OTA.

If it is determined that the performance controller is not associated with the OTA (No in S513), in S517, the management controller may prohibit communication with the performance controller.

The management controller may prohibit, based on the event properties, communication with the performance controller not associated with the OTA.

In S519, the management controller may detect that a CPU load which is greater than or equal to the reference value occurs.

The management controller may determine (or detect) that the CPU load in the management controller is greater than or equal to the reference value.

In S521, the management controller may additionally allocate a CPU resource to a module associated with the OTA, in response to detecting that the CPU load is greater than or equal to the reference value, and may collect a CPU resource from a module not associated with the OTA.

The management controller may reallocate a CPU resource to at least one module in the management controller, in response to a determination that the CPU load is greater than or equal to the reference value.

For example, the management controller may additionally allocate the CPU resource to the module associated with the OTA, in response to a determination that the CPU load is greater than or equal to the reference value, and may collect the CPU resource from the module not associated with the OTA.

The management controller may group the at least one module based on a degree associated with the OTA.

The management controller may assign a priority to each of the groups including the at least one module based on the degree associated with the OTA.

The management controller may variably allocate a CPU resource to the at least one module included in the groups depending on the priority and the CPU load.

A priority of a group with a high degree associated with the OTA among the groups may be set to be higher than a priority of a group with a low degree associated with the OTA.

The management controller may allocate more CPU resources to a group with a high priority than a group with a low priority.

For example, the management controller may collect a CPU resource from the group with the low priority and may additionally allocate the CPU resource to the group with the high priority.

In S523, after the OTA update is ended, the management controller may allow communication of all controllers and may reallocate a CPU resource.

After the OTA update is completed, the management controller may reallocate the CPU resource to the at least one module using a predetermined default value.

After the OTA update is completed, the management controller may adjust the state of communication with all the performance controllers to an allowable state.

After the OTA update is completed, the management controller may adjust the state of communication with a performance controller, communication of which is prohibited because of being not associated with the OTA, to the allowable state.

Figure 6:
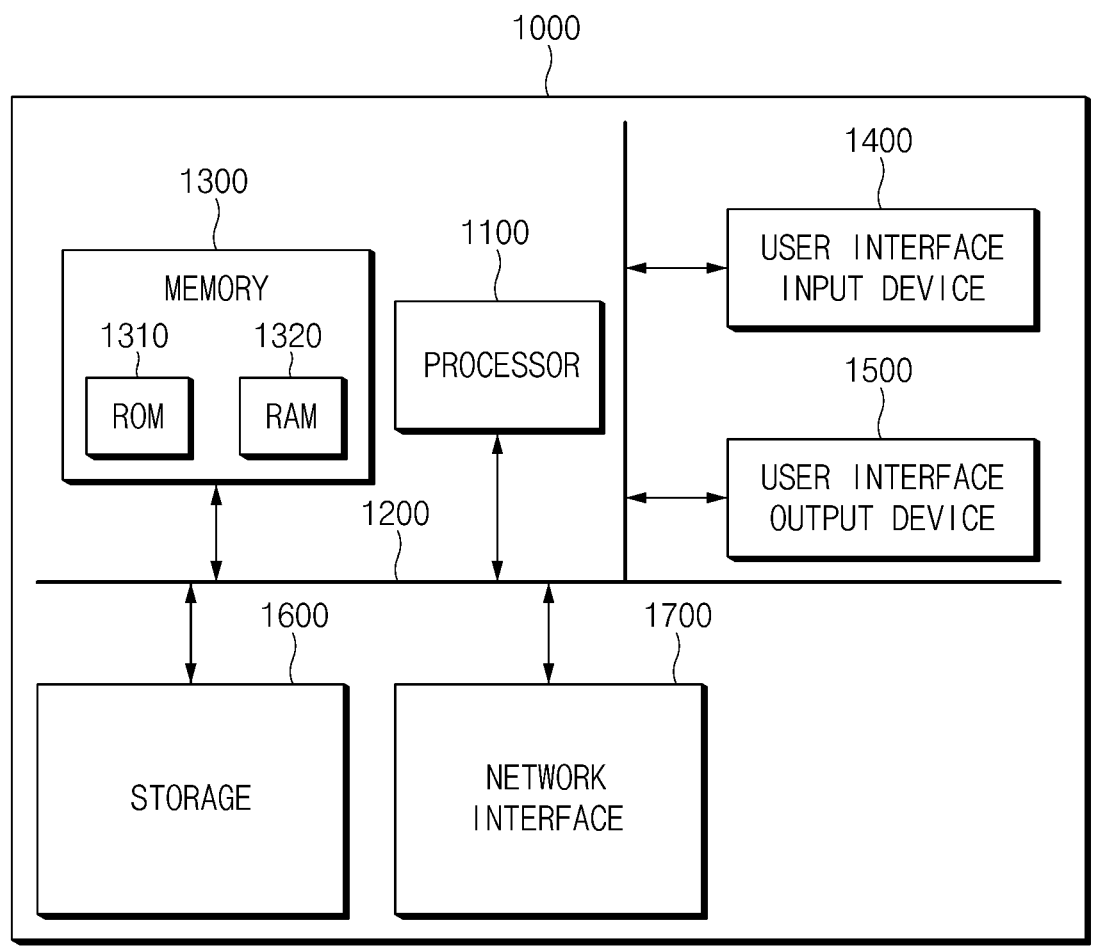
FIG. 6 illustrates a computing system about a vehicular software update system and a method therefor.

FIG. 6 illustrates a computing system about a vehicular software update system and a method therefor according to an embodiment of the present disclosure.

Referring to FIG. 6, a computing system 1000 about the vehicular software update system and the method therefor may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Accordingly, the operations of the method or algorithm described in connection with the embodiments disclosed in the specification may be directly implemented with a hardware module, a software module, or a combination of the hardware module and the software module, which is executed by the processor 1100. The software module may reside on a storage medium (that is, the memory 1300 and/or the storage 1600) such as a RAM, a flash memory, a ROM, an EPROM, an EEPROM, a register, a hard disc, a removable disk, and a CD-ROM.

The exemplary storage medium may be coupled to the processor 1100. The processor 1100 may read out information from the storage medium and may write information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

A description will be given of effects of the vehicular software update system and the method therefor according to various examples of the present disclosure.

According to an aspect of the present disclosure, a vehicular software update system may include a management controller loaded into a vehicle and at least one performance controller that receives software for over-the-air (OTA) update in the background from the management controller. The management controller may determine a network load of the vehicle and may adjust a background transmission speed of the software for OTA update, the software being transmitted to the at least one performance controller, based on a driving state of the vehicle and the network load of the vehicle.

In an example, the management controller may include an intrusion detection module. The management controller may determine the network load of the vehicle based on detecting a controller area network (CAN) message by means of the intrusion detection module.

In an example, the management controller may decrease the background transmission speed in response to that it is determined that the network load of the vehicle is greater than or equal to a reference value, when the driving state of the vehicle is traveling.

In an example, the management controller may decrease the background transmission speed by determining a background transmission interval to correspond to a message interval with a larger value between a minimum message interval capable of being received upon reprogramming in the at least one performance controller and a minimum message interval for each channel, based on a software package and event properties. The software package may include the minimum message interval capable of being received upon the reprogramming in the at least one performance controller. The event properties may include at least one of the minimum message interval for each channel, information of a performance controller associated with OTA, or a combination thereof.

In an example, the management controller may determine a performance controller associated with OTA among the at least one performance controller based on event properties and may allow communication with the performance controller associated with the OTA among the at least one performance controller, in response to that that it is determined that the network load of the vehicle is greater than or equal to a reference value, when the driving state of the vehicle is at end of traveling, and may adjust the background transmission speed by prohibiting communication with a performance controller not associated with the OTA among the at least one performance controller. The event properties may include at least one of a minimum message interval for each channel, information of the performance controller associated with the OTA, or a combination thereof.

In an example, the management controller may return the prohibited communication with the performance controller not associated with the OTA to an allowable state, after an OTA update is completed.

In an example, the management controller may reallocate a central processing unit (CPU) resource to at least one module in the management controller, in response to that it is determined that a CPU load is greater than or equal to a reference value, when the driving state of the vehicle is at end of traveling.

In an example, the management controller may group the at least one module based on a degree associated with OTA, may assign a priority to each of groups including the at least one module based on the degree associated with the OTA, and may variably allocate the CPU resource to the at least one module included in the groups depending on the priority and the CPU load.

In an example, a priority of a group with a high degree associated with the OTA among the groups may be set to be higher than a priority of a group with a low degree associated with the OTA. The management controller may allocate more CPU resources to a group with a high priority than a group with a low priority.

In an example, the management controller may reallocate the CPU resource to the at least one module using a predetermined default value, after an OTA update is completed.

According to another aspect of the present disclosure, a vehicular software update method may include determining, by a management controller, a network load of a vehicle and adjusting, by the management controller, a background transmission speed of software for OTA update, the software being transmitted to at least one performance controller, based on a driving state of the vehicle and the network load of the vehicle.

In an example, the vehicular software update method may further include determining, by the management controller, the network load of the vehicle based on detecting a controller area network (CAN) message by means of an intrusion detection module included in the management controller.

In an example, the adjusting of the background transmission speed may include decreasing, by the management controller, the background transmission speed in response to that it is determined that the network load of the vehicle is greater than or equal to a reference value, when the driving state of the vehicle is traveling.

In an example, the adjusting of the background transmission speed may include determining, by the management controller, the background transmission interval to correspond to a message interval with a larger value between a minimum message interval capable of being received upon reprogramming in the at least one performance controller and a minimum message interval for each channel, based on a software package and event properties. The software package may include the minimum message interval capable of being received upon the reprogramming in the at least one performance controller. The event properties may include at least one of the minimum message interval for each channel, information of a performance controller associated with OTA, or a combination thereof.

In an example, the adjusting of the background transmission speed may include determining, by the management controller, a performance controller associated with OTA among the at least one performance controller based on event properties, allowing, by the management controller, communication with the performance controller associated with the OTA among the at least one performance controller, in response to that that it is determined that the network load of the vehicle is greater than or equal to a reference value, when the driving state of the vehicle is at end of traveling, and adjusting, by the management controller, the background transmission speed by prohibiting communication with a performance controller not associated with the OTA among the at least one performance controller. The event properties may include at least one of a minimum message interval for each channel, information of the performance controller associated with the OTA, or a combination thereof.

In an example, the vehicular software update method may further include returning, by the management controller, the prohibited communication with the performance controller not associated with the OTA to an allowable state, after an OTA update is completed.

In an example, the vehicular software update method may further include reallocating, by the management controller, a central processing unit (CPU) resource to at least one module in the management controller, in response to that it is determined that a CPU load is greater than or equal to a reference value, when the driving state of the vehicle is at end of traveling.

In an example, the reallocating of the CPU resource to the at least one module may include grouping, by the management controller, the at least one module based on a degree associated with OTA, assigning, by the management controller, a priority to each of groups including the at least one module based on the degree associated with the OTA, and variably allocating, by the management controller, the CPU resource to the at least one module included in the groups depending on the priority and the CPU load.

In an example, a priority of a group with a high degree associated with the OTA among the groups may be set to be higher than a priority of a group with a low degree associated with the OTA. The vehicular software update method may further include allocating, by the management controller, more CPU resources to a group with a high priority than a group with a low priority.

In an example, the vehicular software update method may further include reallocating, by the management controller, the CPU resource to the at least one module using a predetermined default value, after an OTA update is completed.

According to one or more aspects of the present disclosure, the vehicular software update system may more stably perform a vehicle function during an OTA update by decreasing an OTA communication load while the vehicle is traveling.

Furthermore, according to one or more aspects of the present disclosure, the vehicular software update system may faster perform an OTA update by increasing an OTA communication load after the driving of the vehicle is ended.

Furthermore, according to one or more aspects of the present disclosure, the vehicular software update system may increase the number of controllers capable of being updated for one event by increasing an OTA communication load after the driving of the vehicle is ended.

Furthermore, according to one or more aspects of the present disclosure, the vehicular software update system may reduce a battery discharge risk because an OTA update time is shortened by increasing the OTA communication load after the driving of the vehicle is ended. In addition, various effects ascertained directly or indirectly through the present disclosure may be provided.

Hereinabove, although the present disclosure has been described with reference to various examples and the accompanying drawings, the present disclosure is not limited thereto, but may be variously modified and altered by those skilled in the art to which the present disclosure pertains without departing from the spirit and scope of the present disclosure claimed in the following claims.

Therefore, the illustrated examples of the present disclosure are not intended to limit the technical spirit of the present disclosure, but provided only for the illustrative purpose. The scope of the present disclosure should be construed on the basis of the accompanying claims, and all the technical ideas within the scope equivalent to the claims should be included in the scope of the present disclosure.

What is claimed is:

1. A vehicular software update system, comprising:
a management controller coupled to a vehicle; and
at least one processor configured to receive, from the management controller, software for over-the-air (OTA) update,
wherein the management controller is configured to:
determine a network load of the vehicle;
adjust, based on a driving state of the vehicle and the network load of the vehicle, a transmission speed of the software for OTA update; and
transmit, to the at least one processor and based on the adjusted transmission speed, the software for OTA update,
wherein the management controller is configured to adjust the transmission speed by decreasing, based on a determination that the driving state of the vehicle corresponds to a traveling state, the transmission speed in response to a determination that the network load of the vehicle is greater than or equal to a reference value.

2. The vehicular software update system of claim 1, wherein the management controller is configured to determine, based on a detection of a controller area network (CAN) message, the network load of the vehicle.

3. The vehicular software update system of claim 1,
wherein the at least one processor is configured to execute a foreground process while receiving the software for OTA update in a background process, and
wherein the management controller is configured to transmit the software for OTA update at a first transmission speed by decreasing the transmission speed from a second transmission speed to the first transmission speed slower than the second transmission speed.

4. The vehicular software update system of claim 1,
wherein the management controller is configured to adjust the transmission speed by determining, based on a software package and based on event properties, a background transmission interval to correspond to a message interval, wherein the message interval corresponds to a larger value between a minimum message interval associated with reprogramming in the at least one processor and a minimum message interval for each channel,
wherein the software package comprises the minimum message interval associated with reprogramming in the at least one processor, and
wherein the event properties comprise at least one of: the minimum message interval for each channel, or information of a processor associated with OTA update among the at least one processor.

5. The vehicular software update system of claim 1, wherein the management controller is further configured to:
determine, based on event properties, a processor associated with OTA update among the at least one processor;
allow, based on a determination that the driving state of the vehicle corresponds to an end of traveling, communication with the processor associated with OTA update among the at least one processor, in response to a determination that the network load of the vehicle is greater than or equal to the reference value; and
adjust the transmission speed by prohibiting communication with a processor not associated with OTA update among the at least one processor, and
wherein the event properties comprise at least one of: a minimum message interval for each channel, or information of the processor associated with OTA update.

6. The vehicular software update system of claim 5, wherein the management controller is configured to, after an OTA update is completed, allow communication with the processor not associated with OTA update.

7. The vehicular software update system of claim 1, wherein the management controller is configured to reallocate, based on a determination that the driving state of the vehicle corresponds to an end of traveling, a central processing unit (CPU) resource to at least one module in the management controller, in response to a determination that a CPU load is greater than or equal to a reference value.

8. The vehicular software update system of claim 7, wherein the management controller is further configured to:
group, based on a degree associated with OTA update, the at least one module;

assign, based on the degree associated with OTA update, a priority to at least one group comprising the at least one module; and allocate, based on the priority and the CPU load, the CPU resource to the at least one module.

9. The vehicular software update system of claim 8, wherein the management controller is further configured to set a priority of a group with a high degree associated with OTA update among a plurality of groups to be higher than a priority of a group with a low degree associated with OTA update among the plurality of groups, and wherein the management controller is configured to allocate more CPU resources to a group with a high priority than a group with a low priority.

10. The vehicular software update system of claim 7, wherein the management controller is configured to, after an OTA update is completed, reallocate the CPU resource to the at least one module using a predetermined default value.

11. A vehicular software update method, comprising:
determining, by a management controller, a network load of a vehicle;
adjusting, by the management controller and based on a driving state of the vehicle and the network load of the vehicle, a transmission speed of software for over-the-air (OTA) update; and
transmitting, by the management controller and based on the adjusted transmission speed, the software for OTA update to at least one processor that receives the software for OTA update in a background process,
wherein the adjusting of the transmission speed comprises:
decreasing, by the management controller and based on a determination that the driving state of the vehicle corresponds to a traveling state, the transmission speed in response to a determination that the network load of the vehicle is greater than or equal to a reference value.

12. The vehicular software update method of claim 11, further comprising:
determining, by the management controller and based on a detection of a controller area network (CAN) message, the network load of the vehicle.

13. The vehicular software update method of claim 11, further comprising executing, by the at least one processor, a foreground process while the at least one processor receives the software for OTA update in the background process,
wherein the transmitting the software for OTA update is performed at a first transmission speed by decreasing the transmission speed from a second transmission speed to the first transmission speed slower than the second transmission speed.

14. The vehicular software update method claim 11, wherein the adjusting of the transmission speed comprises:
determining, by the management controller and based on a software package and based on event properties, a transmission interval to correspond to a message interval, wherein the message interval corresponds to a larger value between a minimum message interval associated with reprogramming in the at least one processor and a minimum message interval for each channel,
wherein the software package comprises the minimum message interval associated with reprogramming in the at least one processor, and wherein the event properties comprise at least one of: the minimum message interval for each channel, or information of a processor associated with OTA update among the at least one processor.

15. The vehicular software update method of claim 11, wherein the adjusting of the transmission speed comprises:
determining, by the management controller and based on event properties, a processor associated with OTA update among the at least one processor;
allowing, by the management controller and based on a determination that the driving state of the vehicle corresponds to an end of traveling, communication with the processor associated with OTA update among the at least one processor, in response to a determination that the network load of the vehicle is greater than or equal to the reference value; and
adjusting, by the management controller, the transmission speed by prohibiting communication with a processor not associated with OTA update among the at least one processor, and
wherein the event properties comprise at least one of: a minimum message interval for each channel, or information of the processor associated with OTA update.

16. The vehicular software update method of claim 15, further comprising:
after an OTA update is completed, allowing, by the management controller, communication with the processor not associated with OTA update.

17. The vehicular software update method of claim 11, further comprising:
reallocating, by the management controller and based on a determination that the driving state of the vehicle corresponds to an end of traveling, a central processing unit (CPU) resource to at least one module in the management controller, in response to a determination that a CPU load is greater than or equal to a reference value.

18. The vehicular software update method of claim 17, wherein the reallocating of the CPU resource to the at least one module comprises:
grouping, by the management controller and based on a degree associated with OTA update, the at least one module;
assigning, by the management controller and based on the degree associated with OTA update, a priority to at least one group comprising the at least one module; and
allocating, by the management controller and based on the priority and the CPU load, the CPU resource to the at least one module.

19. The vehicular software update method of claim 18, wherein a priority of a group with a high degree associated with the OTA update among a plurality of groups is set to be higher than a priority of a group with a low degree associated with OTA update among the plurality of groups, and
wherein the vehicular software update method further comprises:
allocating, by the management controller, more CPU resources to a group with a high priority than a group with a low priority.

20. The vehicular software update method of claim 17, further comprising:
after an OTA update is completed, reallocating, by the management controller, the CPU resource to the at least one module using a predetermined default value.

* * * * *